(12) United States Patent
Snyder

(10) Patent No.: US 6,361,897 B1
(45) Date of Patent: Mar. 26, 2002

(54) DUAL TERMINAL BATTERY FOR MODULAR POWER SUPPLY AND POWER SUPPLY

(75) Inventor: Charles Edwin Snyder, Leesport, PA (US)

(73) Assignee: Enersys Inc., Reading, PA (US)

( * ) Notice: Subject to any disclaimer, the term of this patent is extended or adjusted under 35 U.S.C. 154(b) by 0 days.

(21) Appl. No.: 09/338,476

(22) Filed: Jun. 22, 1999

(51) Int. Cl.7 .................................................. H01M 2/30
(52) U.S. Cl. ........................................ 429/178; 429/179
(58) Field of Search ................................ 429/178, 179; H01M 2/30

(56) References Cited

U.S. PATENT DOCUMENTS

| | | |
|---|---|---|
| 2,942,058 A | 6/1960 | Herold |
| 3,607,434 A | 9/1971 | Allen et al. |
| 4,347,294 A | 8/1982 | Mejia |
| 4,425,414 A * | 1/1984 | Solomon ................. 429/178 X |
| 5,104,752 A * | 4/1992 | Baughman et al. ..... 429/178 X |
| 5,140,744 A | 8/1992 | Miller |
| 5,149,605 A | 9/1992 | Dougherty |
| 5,304,434 A | 4/1994 | Stone |
| 5,366,827 A | 11/1994 | Belanger et al. |
| 5,639,571 A | 6/1997 | Waters et al. |

FOREIGN PATENT DOCUMENTS

JP          40-6124698          5/1994

* cited by examiner

Primary Examiner—John S. Maples
(74) Attorney, Agent, or Firm—Akin, Gump, Strauss, Hauer & Feld, L.L.P.

(57) ABSTRACT

A battery for use with a modular battery assembly is provided. The battery includes two poles, with each pole including a dual terminal. Each dual terminal includes a first connector and a second connector. The battery is adapted to be mounted in either of a first housing, with a wiring board having a prewired circuit located thereon connected to slide-in terminals arranged on the wiring board, and a second housing without a prewired circuit. The slide-in terminals arranged on the wiring board are adapted to be located in complementary positions to the first connectors on the battery such that when the battery is slidably received in the first housing, the first connectors are adapted to be received in the complementarily positioned slide-in terminals, and when the battery is located in the second housing, the second connectors are connectable using jumpers such that the battery is adapted to be used interchangeably in the first and second housings.

1 Claim, 2 Drawing Sheets

DUAL TERMINAL BATTERY FOR MODULAR POWER SUPPLY AND POWER SUPPLY

BACKGROUND OF THE INVENTION

The present invention relates to electric storage batteries, and more particularly, to batteries for use in modular power supplies as well as power supplies constructed using such batteries.

Storage batteries, particularly those used for stand-by emergency power, such as in telecommunications equipment and uninterruptable power supplies for computers, are often assembled on site from modules containing multiple battery cells. For example, modules containing four two-volt cells connected in series produce eight volts. A 48 volt battery can be assembled by connecting six modules in series, and a 120 volt battery can be produced by connecting 15 modules in series. Capacities can be varied by the number of plates in each cell (with a commensurate increase in the individual cell dimensions) or by different wiring connections between the cells or modules, such as connecting some of the modules in parallel.

It is known to provide such modules by placing batteries in trays. The trays are then held in rectangular steel racks or stands for support. The modules can be installed to lie horizontally, stand vertically or be mounted face up in the metal stands. Cells within the racks may be installed and replaced individually and the cell terminal posts are generally exposed for making electrical connections. Generally, conductor bars or cables are used to make electrical connections between adjacent cells and/or adjacent modules. Jumpers are also used to make the connections between modules to provide the desired battery voltage and capacity.

It has also been known to use connector bars between cells and to arrange the batteries and modules to provide a minimum spacing in order to allow the use of short conductor bars to reduce losses. However, longer conductor bars are still required to connect multiple modules together.

It is also known to provide keyed connectors on the battery modules in order to prevent a battery module from being installed improperly. Preferably, the keyed connectors are provided on the racks such that a standardized module can be provided. However, the known prior art power supplies all require individual connections to be made, either between individual cells being replaced or assembled or between preassembled modules which may be preassembled prior to installation in an assembly rack. This requires additional on site time during assembly of a new modular power supply and also requires additional time for maintenance since the jumpers or connector bars connected between the individual cells and modules must be manually removed and reinstalled in order to remove and/or replace a battery cell or module.

BRIEF SUMMARY OF THE INVENTION

Briefly stated, the present invention provides a battery for use with a modular battery assembly. The battery includes two poles, with each pole including a dual terminal. Each dual terminal includes a first connector and a second connector. The battery is adapted to be mounted in either of a first housing, with a wiring board having a prewired circuit located thereon connected to slide-in terminals arranged on the wiring board, and a second housing without a prewired circuit. The slide-in terminals arranged on the wiring board are adapted to be located in complementary positions to the first connectors on the battery such that when the battery is slidably received in the first housing, the first connectors are adapted to be received in the complementarily positioned slide-in terminals, and when the battery is located in the second housing, the second connectors are connectable using jumpers such that the battery is adapted to be used interchangeably in the first and second housings.

In another aspect, the present invention provides, a modular power supply assembly. The assembly includes a housing adapted to slidably receive more than one battery. A wiring board is located in the housing and includes a prewired circuit located thereon connected to slide-in terminals arranged on the wiring board. A plurality of batteries are provided with each battery having two battery poles. Each battery pole includes a dual terminal, with each dual terminal having a first connector and a second connector. The batteries are slidably mounted in the housing. The slide-in terminals arranged on the wiring board are located in complementary positions to the first connectors on the batteries, such that as each battery is slidably received in the housing, the first connectors are received in the complementarily positioned slide-in terminals to connect the batteries in accordance with the prewired circuit.

In another aspect, the present invention provides a method for connecting a plurality cells together for a power supply. The method includes providing a plurality of battery cells, with each battery cell having two battery poles and each battery pole including a dual terminal. Each dual terminal has a first connector and a second connector, with the first connectors being adapted to be received in slide-in sockets and the second connectors including a jumper connection, and one of: (a) providing a back plane wiring board in a first housing which is adapted to slidably receive more than one battery, providing a prewired circuit on the back plane wiring board, with the prewired circuit being connected to slide-in terminals arranged on the wiring board, locating the slide-in connectors on the back plane wiring board in complementary positions to the first connectors located on each battery pole of the battery cells, and sliding each battery cell into the first housing such that the first connectors on each of the poles of each battery are received in the complementarily located slide-in connectors on the back plane wiring board to complete the circuit between the cells to form a power supply having a desired output voltage; and (b) positioning the battery cells in a second housing, and connecting jumpers to the second connectors on the poles of the battery cells in a desired circuit to form a power supply having a desired output voltage, such that the same battery cells can be used interchangeably for assembling power supplies without back plane wiring boards.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF THE INVENTION

Figure 1:
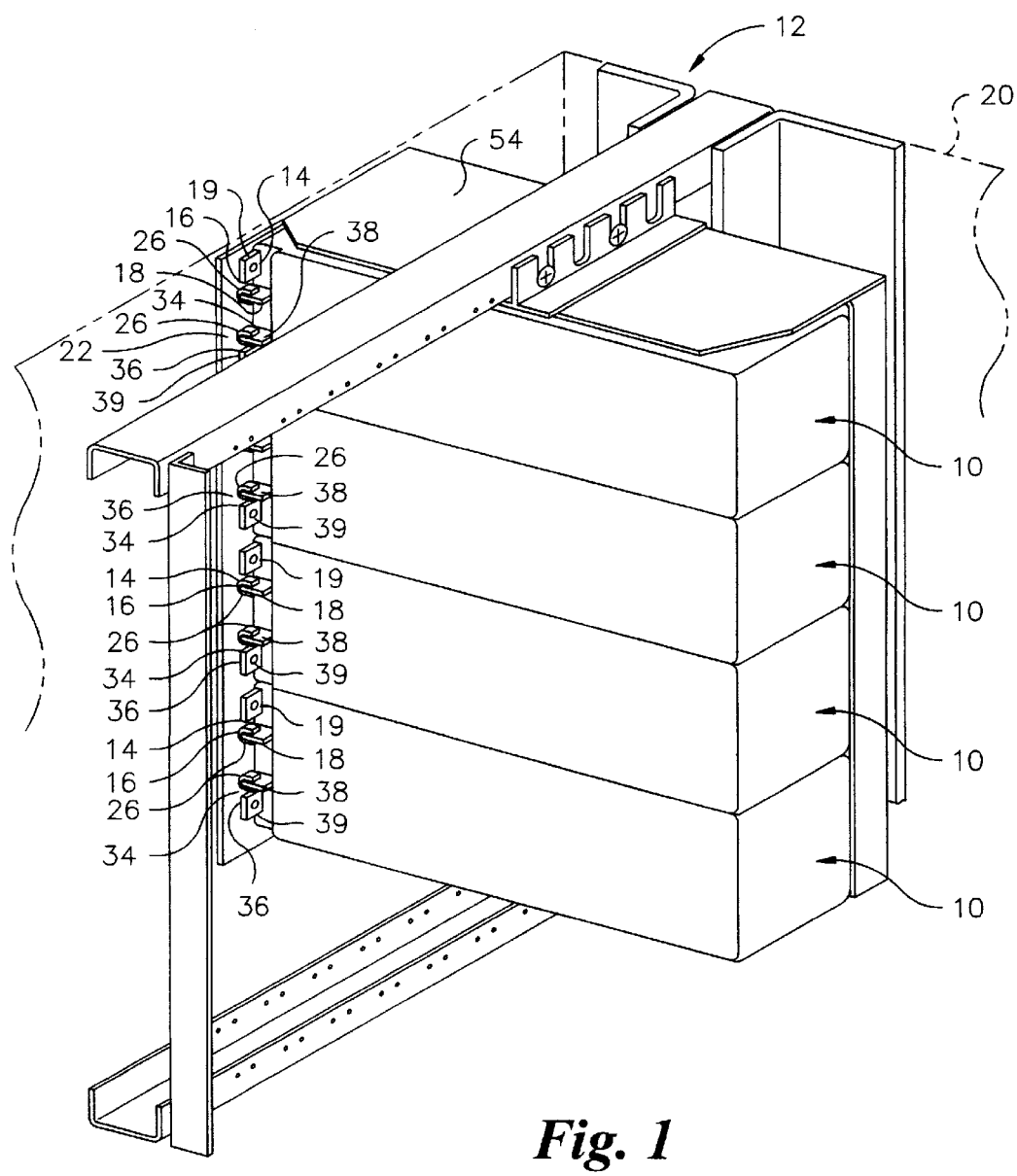
FIG. 1 is a perspective view, partially broken away, of a modular power supply rack having a plurality of dual terminal batteries in accordance with the present invention which are connected together by a back plane wiring board.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the dual terminal batteries and modular power supply, and designated parts thereof. The terminology includes the words above specifically mentioned, derivatives thereof and words of similar import.

Figure 2:
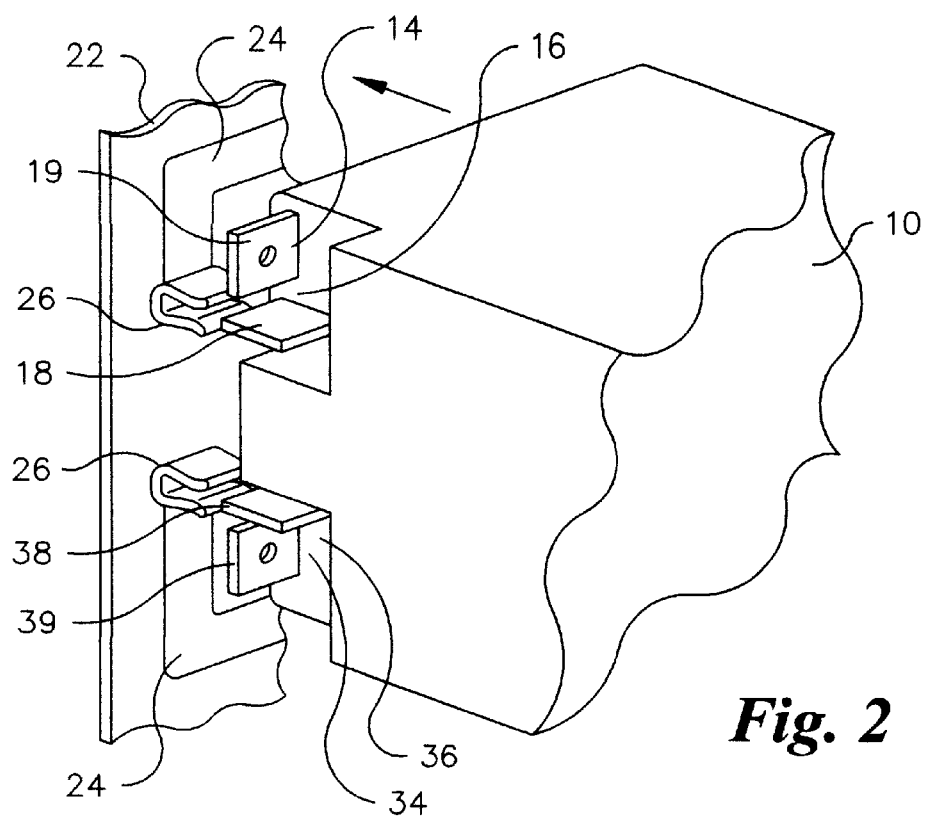
FIG. 2 is an enlarged, partial perspective view showing a dual terminal battery in accordance with the present invention being slidably installed and electrically connected to other batteries by the back plane wiring board.
Figure 3:
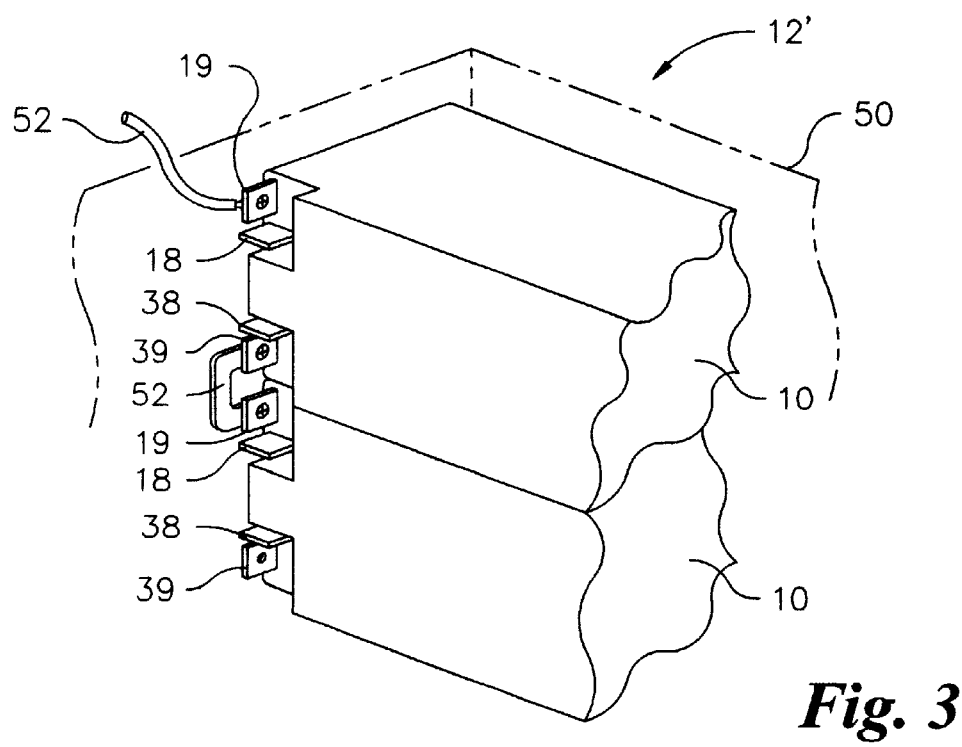
FIG. 3 is a partial perspective view of the dual terminal batteries in accordance with the present invention electrically connected together using connector bars or jumpers.

Referring to the drawings, wherein like numerals indicate like elements throughout, there are shown in FIGS. 1–3 dual terminal batteries 10 for use with a modular battery assembly 12, which is preferably a modular or uninterruptable power supply, in accordance with the present invention. As shown in detail in FIGS. 1 and 2, the battery 10 has two battery poles 14, 34, which represent the positive and negative poles, respectively. Each battery pole 14, 34 includes a dual terminal 16, 36. Each dual terminal has a first connector 18, 38 and a second connector 19, 39. The battery 10 is adapted to be mounted in either a first housing 20, as shown in phantom line in FIG. 1, having a back plane wiring board 22 with pre-wired circuits 24 located thereon. The pre-wired circuits may be etched on the wiring board 22, which may be a printed circuit board, or may be separate wires or conductor bars attached to the board 22 in order to provide the required cross-section of material in the wires or conductor bars to carry the current load. The pre-wired circuits 24 are connected to slide-in terminals 26 which are arranged on the wiring board 22 in complementary positions to the first connectors 18 on the batteries 10. When the batteries 10 are slidably received in the first housing 20, the first connectors 18, 38 on the first and second poles 14, 34 are received in the complementarily positioned slide-in terminals 26 to create an electrical connector, interconnecting the batteries 10 in a predetermined manner.

As shown in detail in FIG. 2, preferably the first connectors 18, 38 are slide-in spade connectors. Additionally, preferably the slide-in terminals 26 are generally U-shaped spring clips having a flared open end such that the spade connectors are guided into the terminals 26. However, it will be recognized by those skilled in the art from the present disclosure that other suitable types of slide-in connectors, such as a plug and socket arrangement, could be used if desired.

As shown in detail in FIGS. 1–3, preferably the batteries 10 are keyed such that if the batteries 10 are installed incorrectly, the first connectors 18, 38 on each pole 14, 34 will not contact either of the associated slide-in terminals 24. Preferably, this is accomplished by locating the dual connector terminal 16, 36 for each pole 14, 34 on an end of the battery adjacent to one side. However, it will be recognized by those skilled in the art from the present disclosure that the arrangement of the dual connector terminal 16, 36 can be varied, as desired.

As shown in FIG. 3, the battery 10 is also adapted for mounting in a second housing 50 which does not include a wiring board 22. When the batteries 10 are located in the second housing 50, the second connectors 19, 39 located on the first and second poles 14, 34 are connectable to form the desired circuit using jumpers or connector bars 52 (referred to here interchangeably as "jumpers") to form a modular battery assembly 12'. Using the dual connector arrangement 16, 26, the battery 10 is adapted to be used interchangeably in the first and second housings 20, 50 to form a modular power supply 12, 12'.

The housings 20, 50 may be made of any suitable metallic or polymeric materials, and preferably the batteries 10 are mounted in a rigid frame. Groups of four batteries may be provided in a modular tray 54 for ease of handling, with the tray being slidable into and out of the housing 20, as shown in FIG. 1. However, it will be recognized by those skilled in the art from the present disclosure that the number of batteries which are grouped together can be varied, as desired. For example, six batteries could be grouped together in a tray 54.

The present invention finds use with many types of batteries 10 such as lead-acid batteries which are typically used in modular power supplies and uninterruptable power supplies. The present dual connector battery 10 provides all of the advantages of the known batteries for modular power supplies and uninterruptable power supplies which allow replacement of individual cells, and has the added advantage of allowing for easier maintenance and replacement of battery cells 10 when used in connection with a modular battery assembly or power supply 12 which includes the wiring board 22 and slide-in terminals 26. However, it can also be used in the prior known housings using jumpers for connection of the terminals via the second connectors 19, 39. This allows the same battery 10 to be used in different modular battery or power supply assemblies 12.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

What is claimed is:

1. A battery for use with a modular battery assembly comprising:

a battery housing having at least one end, at least one side and two poles, a positive pole and a negative pole, each pole comprising a dual terminal located on one side of the battery housing proximate to the one end, each terminal having a first slide-type connector extending generally perpendicular to the one end of the battery housing and a second connector extending generally parallel to the one end of the battery housing and generally perpendicular to the first connector, the battery being adapted to be mounted in either of a first housing with a wiring board having a pre-wired circuit located thereon connected to slide-in terminals arranged on the wiring board and a second housing without a pre-wired circuit, the slide-in terminals of the first housing being located in complimentary positions to the first connectors on the battery such that when the one end of the battery housing is slideably received in the first housing, the first connectors are received in the complimentary positioned slide-in terminals, and when the battery is located in the second housing, the second connectors are connectable using jumpers such that the battery may be used interchangeable in either of the first and second housings.

* * * * *